United States Patent
Li

(10) Patent No.: US 11,200,337 B2
(45) Date of Patent: Dec. 14, 2021

(54) SYSTEM AND METHOD FOR USER DATA ISOLATION

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 439 days.

(21) Appl. No.: 16/272,770

(22) Filed: Feb. 11, 2019

(65) Prior Publication Data

US 2020/0257820 A1    Aug. 13, 2020

(51) Int. Cl.
| | |
|---|---|
| *G06F 21/62* | (2013.01) |
| *G06F 21/60* | (2013.01) |
| *G06F 12/1009* | (2016.01) |
| *G06F 12/02* | (2006.01) |
| *H04L 29/08* | (2006.01) |

(52) U.S. Cl.
CPC ...... *G06F 21/6245* (2013.01); *G06F 12/0246* (2013.01); *G06F 12/1009* (2013.01); *G06F 21/602* (2013.01); *G06F 21/604* (2013.01); *H04L 67/1097* (2013.01); *G06F 2212/7201* (2013.01); *G06F 2221/2143* (2013.01)

(58) Field of Classification Search
USPC .......................................................... 726/26
See application file for complete search history.

(56) References Cited

U.S. PATENT DOCUMENTS

| | | | |
|---|---|---|---|
| 3,893,071 | A | 7/1975 | Bossen |
| 4,562,494 | A | 12/1985 | Bond |
| 4,718,067 | A | 1/1988 | Peters |
| 4,775,932 | A | 10/1988 | Oxley |
| 4,858,040 | A | 8/1989 | Hazebrouck |
| 5,394,382 | A | 2/1995 | Hu |
| 5,602,693 | A | 2/1997 | Brunnett |

(Continued)

FOREIGN PATENT DOCUMENTS

| | | |
|---|---|---|
| WO | 9418634 | 8/1994 |
| WO | 1994018634 | 8/1994 |

OTHER PUBLICATIONS

Motwani, Rakhi C., Frederick C. Harris Jr, and Kostas E. Bekris. "A proposed digital rights management system for 3d graphics using biometric watermarks." 2010 7th IEEE Consumer Communications and Networking Conference. IEEE, 2010 (Year: 2010).*

(Continued)

*Primary Examiner* — Syed A Zaidi
(74) *Attorney, Agent, or Firm* — Shun Yao; Park, Vaughan, Fleming & Dowler

(57) ABSTRACT

One embodiment described herein provides a system and method for isolating data written by different users on a cloud drive. During operation, the system receives a write request from a first user comprising to-be-written data, the to-be-written data being associated with a writer's identifier for the first user. The system then writes the to-be-written data bound with the writer's identifier into physical media associated with the cloud drive, thereby facilitating user data isolation by preventing a second user having a reader's identifier that is different from the writer's identifier of the first user from gaining access to the written data.

20 Claims, 9 Drawing Sheets

(56) References Cited

U.S. PATENT DOCUMENTS

| | | |
|---|---|---|
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,825,937 B2 | 9/2014 | Atkisson |
| 8,832,688 B2 | 9/2014 | Tang |
| 8,868,825 B1 | 10/2014 | Hayes |
| 8,904,061 B1 | 12/2014 | O'Brien, III |
| 9,015,561 B1 | 4/2015 | Hu |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 9,607,631 B2 | 3/2017 | Rausch |
| 9,747,202 B1 | 8/2017 | Shaharabany |
| 9,852,076 B1 | 12/2017 | Garg |
| 9,875,053 B2 | 1/2018 | Frid |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,318,467 B2 | 6/2019 | Barzik |
| 10,361,722 B2 | 7/2019 | Lee |
| 10,437,670 B1 | 10/2019 | Koltsidas |
| 10,642,522 B2 | 5/2020 | Li |
| 10,649,657 B2 | 5/2020 | Zaidman |
| 10,678,432 B1 | 6/2020 | Dreier |
| 10,756,816 B1 | 8/2020 | Dreier |
| 2001/0032324 A1 | 10/2001 | Slaughter |
| 2001/0046295 A1* | 11/2001 | Sako ............. G11B 20/00557 380/201 |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0161890 A1 | 10/2002 | Chen |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0255171 A1 | 12/2004 | Zimmer |
| 2004/0268278 A1 | 12/2004 | Hoberman |
| 2005/0038954 A1 | 2/2005 | Saliba |
| 2005/0097126 A1 | 5/2005 | Cabrera |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0156009 A1* | 7/2006 | Shin ..................... H04L 63/123 713/176 |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0283081 A1 | 12/2007 | Lasser |
| 2007/0285980 A1 | 12/2007 | Shimizu |
| 2008/0028223 A1* | 1/2008 | Rhoads ................ G07D 7/004 713/176 |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0195829 A1* | 8/2008 | Wilsey ............... G06F 12/1433 711/163 |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0183052 A1 | 7/2009 | Kanno |
| 2009/0282275 A1 | 11/2009 | Yermalayeu |
| 2009/0287956 A1 | 11/2009 | Flynn |
| 2009/0307249 A1 | 12/2009 | Koifman |
| 2009/0310412 A1 | 12/2009 | Jun-Ho |
| 2010/0169470 A1 | 7/2010 | Takashige |
| 2010/0217952 A1 | 8/2010 | Iyer |
| 2010/0229224 A1 | 9/2010 | Etchegoyen |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0246392 A1 | 9/2012 | Cheon |
| 2012/0278579 A1 | 11/2012 | Goss |
| 2012/0284587 A1 | 11/2012 | Yu |
| 2012/0331207 A1 | 12/2012 | Lassa |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |

(56) References Cited

U.S. PATENT DOCUMENTS

| | | |
|---|---|---|
| 2013/0166820 A1 | 6/2013 | Batwara |
| 2013/0173845 A1 | 7/2013 | Aslam |
| 2013/0179898 A1* | 7/2013 | Fang .................. H04L 67/1097 719/312 |
| 2013/0191601 A1 | 7/2013 | Peterson |
| 2013/0219131 A1 | 8/2013 | Alexandron |
| 2013/0238955 A1 | 9/2013 | D Abreu |
| 2013/0254622 A1 | 9/2013 | Kanno |
| 2013/0318283 A1 | 11/2013 | Small |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0039849 A1* | 2/2015 | Lewis .................. G06F 12/109 711/203 |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0186657 A1* | 7/2015 | Nakhjiri ................ H04L 9/0894 713/155 |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0294684 A1 | 10/2015 | Qjang |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077749 A1 | 3/2016 | Ravimohan |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0124742 A1* | 5/2016 | Rangasamy ........ H04L 41/0803 717/103 |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0321002 A1 | 11/2016 | Bong-Kil |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Takashi |
| 2017/0228157 A1 | 8/2017 | Yang |
| 2017/0242722 A1 | 8/2017 | Qiu |
| 2017/0249162 A1 | 8/2017 | Tsirkin |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0143780 A1 | 5/2018 | Cho |
| 2018/0165038 A1 | 6/2018 | Authement |
| 2018/0167268 A1 | 6/2018 | Liguori |
| 2018/0173620 A1 | 6/2018 | Cen |
| 2018/0188970 A1 | 7/2018 | Liu |
| 2018/0189182 A1 | 7/2018 | Wang |
| 2018/0212951 A1 | 7/2018 | Goodrum |
| 2018/0226124 A1 | 8/2018 | Perner |
| 2018/0232151 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0336921 A1 | 11/2018 | Ryun |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0065085 A1 | 2/2019 | Jean |
| 2019/0073262 A1 | 3/2019 | Chen |
| 2019/0087115 A1 | 3/2019 | Li |
| 2019/0087328 A1 | 3/2019 | Kanno |
| 2019/0171532 A1 | 6/2019 | Abadi |
| 2019/0205206 A1 | 7/2019 | Hornung |
| 2019/0227927 A1 | 7/2019 | Miao |
| 2019/0272242 A1 | 9/2019 | Kachare |
| 2019/0278654 A1 | 9/2019 | Kaynak |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0097189 A1 | 3/2020 | Tao |
| 2020/0159425 A1 | 5/2020 | Flynn |
| 2020/0167091 A1 | 5/2020 | Haridas |
| 2020/0348888 A1 | 11/2020 | Kim |

OTHER PUBLICATIONS

(56) References Cited

OTHER PUBLICATIONS

NPL Search Terms (Year: 2021).*
C. Wu, D. Wu, H. Chou and C. Cheng, "Rethink the Design of Flash Translation Layers in a Component-Based View", in IEEE Acess, vol. 5, pp. 12895-12912, 2017.
Po-Liang Wu, Yuan-Hao Chang and T. Kuo, "A file-system-aware FTL design for flash-memory storage systems," 2009, pp. 393-398.
S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.
A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.
J. Jung and Y. Won, "nvramdisk: A Transactional Block Device Driver for Non-Volatile RAM", in IEEE Transactions on Computers, vol. 65, No. 2, pp. 589-600, Feb. 1, 2016.
S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.
Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.
Jimenex, X., Novo, D. and P. Ienne, "Pheonix:Reviving MLC Blocks as SLC to Extend NAND Flash Devices Lifetime," Design, Automation & Text in Europe Conference & Exhibition (Date), 2013.
Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.
Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741 >. <hal-01654985>.
EMC Powerpath Load Balancing and Failover Comparison with native MPIO operating system solutions. Feb. 2011.
htttps://web.archive.org/web/20071130235034/http://en.wikipedia.org:80/wiki/logical_block_addressing Wikipedia screen shot retriefed on wayback Nov. 20, 2007 showing both physical and logical addressing used historically to access data on storage devices (Year: 2007).
Tsuchiya, Yoshihiro et al. "DBLK: Deduplication for Primary Block Storage", MSST 2011, Denver, CO, May 23-27, 2011 pp. 1-5.
Chen Feng, et al. "CAFTL: A Content-Aware Flash Translation Layer Enhancing the Lifespan of Flash Memory based Solid State Devices"< FAST'11, San Jose, CA Feb. 15-17, 2011, pp. 1-14.
Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.
WOW: Wise Ordering for Writes—Combining Spatial and Temporal Locality in Non-Volatile Caches by Gill (Year: 2005).
Helen H. W. Chan et al. "HashKV: Enabling Efficient Updated in KV Storage via Hashing", https://www.usenix.org/conference/atc18/presentation/chan, (Year: 2018).

* cited by examiner

SYSTEM AND METHOD FOR USER DATA ISOLATION

BACKGROUND

Field

This disclosure is generally related to cloud storage. More specifically, this disclosure is related to a method and system that provides user data isolation in cloud storage drives.

Related Art

The rapid development in cloud computing enables growth in cloud storage services. Cloud storage service providers own and maintain large-capacity physical storage drives. Individual or enterprise users buy or lease storage capacity from cloud storage service providers to store their data.

To ensure the performance of the cloud storage products, cloud service providers (CSPs) may sell or lease the disk drive (e.g., solid-state drive (SSD) or hard-disk drive (HDD)) capacity directly to users as block storage devices (e.g., network drives). In other words, a CSP may sell or lease individual disk drives to users and allow the users to set up their own file systems or applications on the individual disk drives. However, this approach makes it harder to maintain user data privacy when the disk drives are sold or leased to different users.

SUMMARY

One embodiment described herein provides a system and method for isolating data written by different users on a cloud drive. During operation, the system receives a write request from a first user comprising to-be-written data, the to-be-written data being associated with a writer's identifier for the first user. The system then writes the to-be-written data bound with the writer's identifier into physical media associated with the cloud drive, thereby facilitating user data isolation by preventing a second user having a reader's identifier that is different from the writer's identifier of the first user from gaining access to the written data.

In a variation on this embodiment, the system updates a mapping between a logical address and a physical address of the to-be-written data subsequent to writing the to-be-written data and stores the updated mapping in a location-mapping table located on the cloud drive.

In a further variation, the location-mapping table can include a first-level table indexed using most significant bits (MSB) of the logical address and a second-level table indexed using least significant bits (LSB) of the logical address.

In a further variation, the system prepares the cloud drive for resale by removing the location-mapping table from the cloud drive.

In a variation on this embodiment, the system binds the writer's identifier with the to-be-written data by appending the writer's identifier to the to-be-written data and performing a channel-encoding operation on the to-be-written data and the appended writer's identifier.

In a variation on this embodiment, the writer's identifier can be generated by calculating a hash function based on identification information associated with the first user.

In a variation on this embodiment, the system erases, in a background, data of a previous user subsequent to selling the cloud drive to a new user.

One embodiment described herein provides a system and method for isolating data written by different users on a cloud drive. During operation, the system receives a read request from a first user for data stored on the cloud drive, the first user having a reader's identifier. The system retrieves, based on the read request, data from physical media associated with the cloud drive, the retrieved data being associated with a writer's identifier of a second user; and extracts the writer's identifier from the retrieved data. In response to determining that the extracted writer's identifier does not match the generated reader's identifier, the system denies the read request.

In a variation on this embodiment, the system obtains a logical-address-to-physical-address mapping based on the read request, performs a lookup in a location-mapping table currently stored on the cloud drive based on the obtained logical-address-to-physical address mapping, and denies the read request in response to failing to find a matching entry.

In a variation on this embodiment, denying the read request can include responding to the read request using a dummy data pattern.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention solve the problem of ensuring the privacy or security of user data previously stored on cloud storage drives after such drives have been sold or leased to different users. More specifically, a user-data-security or user-data-isolation measure can be implemented to ensure user data isolation. The user-data-security measure can include two levels of protections. The first level of protection relies on the validation of the mapping between logical locations and physical locations. Moreover, by resetting or erasing the mapping table each time the disk drive is sold or leased to a different user, the system prevents that user from accessing data of the previous user. The second level of protection relies on uniquely assigned user identifiers (IDs), which can be built into the written data to ensure that only verified writers of the data can read out the data.

User Data Isolation Scheme

Figure 1:
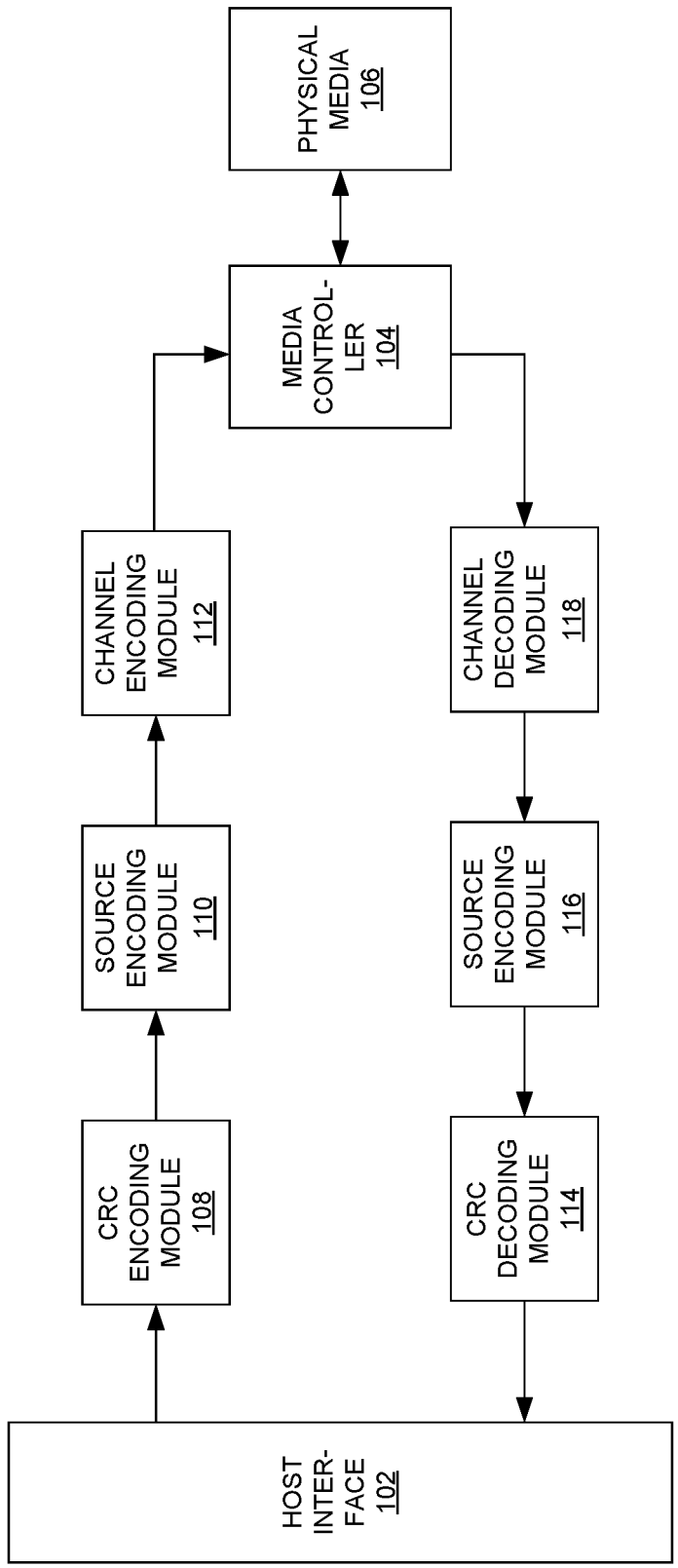
FIG. 1 illustrates the architecture of an exemplary conventional storage system (prior art).

FIG. 1 illustrates the architecture of an exemplary conventional storage system (prior art). Storage system 100 can include a host interface 102 for interfacing with the host device and a media controller 104 for writing data to physical media 106. On the data-write path, storage system 100 can include various encoding modules, such as a cyclic-redundancy-check (CRC)-encoding module 108, a source-encoding module 110, and a channel-encoding module 112. On the data-read path, storage system 100 can include various decoding modules, such as a CRC-decoding module 114, a source-decoding module 116, and a channel-decoding module 118. During data writing, user data received at host interface 102 is encoded before being written into physical media 106. During data reading, user data stored on physical media 106 is decoded before being returned to the user via host interface 102.

In cloud storage settings, the cloud service provider can rent or lease the drive (e.g., storage system 100) to a cloud user (which can be an individual or an organization), for storing user data. After the lease to a current user expires, the current user no longer has access to the drive, and the cloud service provider can rent the drive to a different user.

However, before renting the drive to the different user, the cloud service provider needs to make sure that the different user cannot access the data of the previous user remaining on physical media 106. One straightforward solution is data encryption. In this scenario, all user data are encrypted using a standard symmetric encryption technique (e.g., Advanced Encryption Standard (AES)). Disk drives having strong encryption (e.g., AES 256) can be sold at a much higher price. However, software-based implementation of data encryption is slow and consumes a considerable amount of CPU resources, thus resulting in a low efficiency. Another solution for protecting the data of the previous user is to overwrite the physical media multiple times before renting the disk to a new user. However, due to the limited write throughput and the large capacity of the drives, overwriting the physical media can be slow and impractical. For example, the capacity of a large HDD can be up to 12 TB and its write throughput is around 110 MB/s. To ensure user data security, the security regulation requires that the physical media be overwritten multiple times (e.g., five times) before resale. Consequently, overwriting the entire disk five times can take days, thus significantly delaying the resale of the disk drive and increasing the cost of the cloud storage product.

To solve this problem (i.e., to ensure the security of the data of the previous user after disk resale), in some embodiments, the storage system can implement a user-data-security or user-data-isolation measure. The user-data-security measure requires the data written into the physical media to be bound with a unique user ID issued to the writer such that only the data writer can read out the data. Moreover, the user-data-security measure requires the location mapping to be validated before user data can be read. By erasing the location mapping before resale, one can prevent the data of the previous user from being accessible to a later user. In order to implement such a security measure, the improved storage system can include, in addition to the modules (e.g., the various encoding and decoding modules) existing in a conventional storage system, modules for validating location mapping as well as modules for validating the unique user ID.

Figure 2:
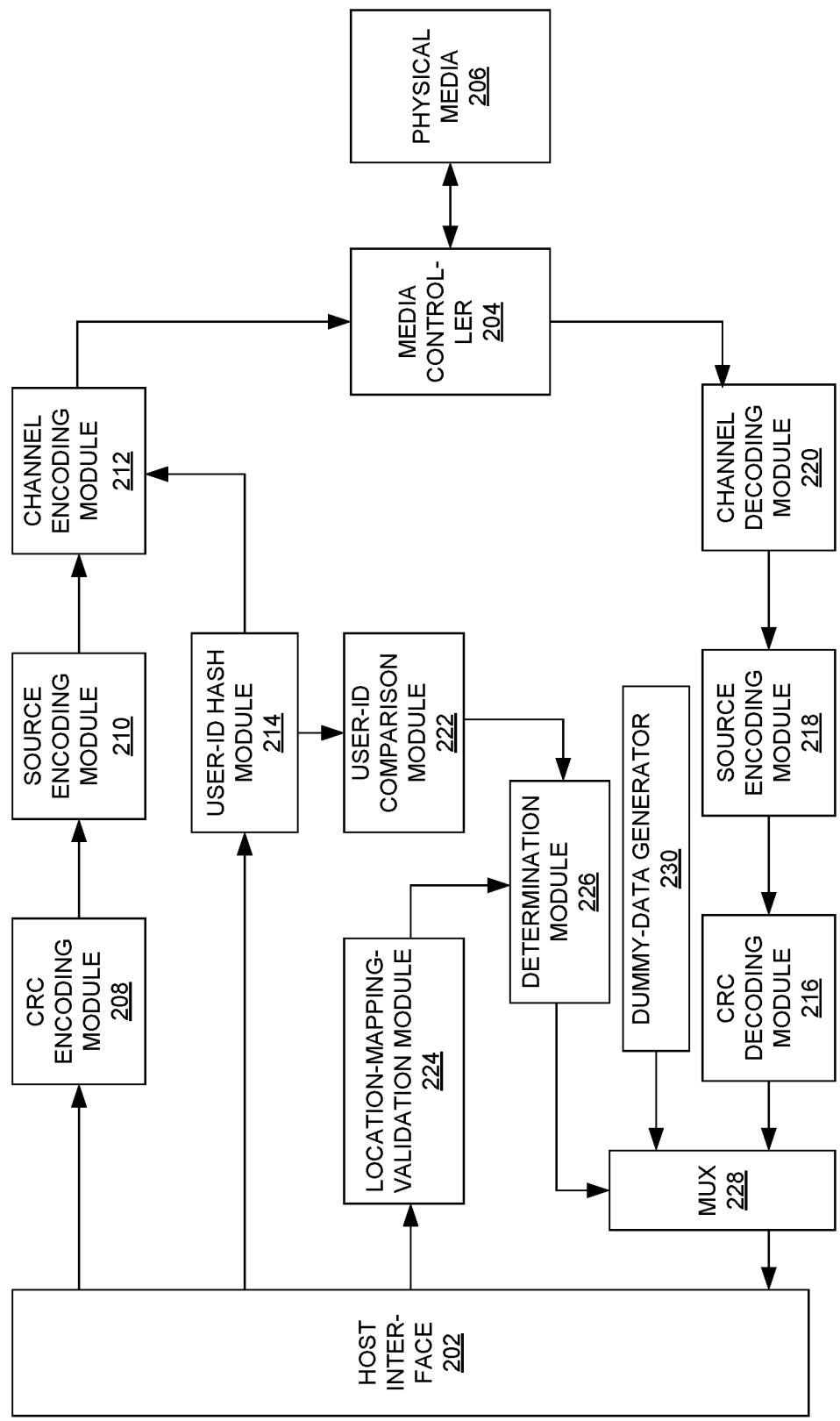
FIG. 2 presents an exemplary storage system, according to one embodiment.

FIG. 2 presents an exemplary storage system, according to one embodiment. Storage system 200 can include a host interface 202 for interfacing with the host device and a media controller 204 for writing data to physical media 206. On the data-write path, storage system 200 can include various encoding modules, such as a CRC-encoding module 208, a source-encoding module 210, and a channel-encoding module 212. In addition, the write path can also include a user-ID hash module 214, which can be used to generate a unique user ID for each user. In some embodiments, user-ID hash module 214 can use the unique information of each user (e.g., name, address, and/or other types of user identification information) and a predetermined hash function to generate a unique user ID for each user. More specifically, the hash function is selected in such a way that there is no hash collision. The hash function is internal to storage system 200 in such a way that it is unlikely that the unique user ID will be exposed to the world outside of storage system 200. In other words, even the user himself typically is not aware of the unique user ID generated by user-ID hash module 214. The hash-generated unique user ID can be bound with the user data intended to be written into physical media 206.

In some embodiments, binding the unique user ID (also referred to as the writer's ID) with the to-be-written user data can be performed by an encoding module (e.g., channel-encoding module 212). More specifically, before performing channel encoding, channel-encoding module 212 can group the unique user ID with the to-be-written data. For example, the unique user ID can be appended to the to-be-written data, and channel-encoding module 212 can perform an error-control coding scheme (e.g., forward-error-control (FEC) coding) on the user-ID-appended user data to generate parity bits. If channel-encoding module 212 is a block encoder, the unique user ID can be appended to each data block. Each codeword that includes a block of the to-be-written data, the unique user ID, and the parity bits outputted by channel-encoding module 212 can then be written to physical media 206, which can include NAND flash or HDD platters.

On the data-read path, storage system 200 can include various decoding modules, such as a CRC-decoding module 216, a source-decoding module 218, and a channel-decoding module 220. Moreover, the data-read path of storage system 200 can also include user-ID-hash module 214, a user-ID-comparison module 222, a location-mapping-validation module 224, a determination module 226, a multiplexing module 228, and a dummy-data generator 230.

Note that user-ID-hash module 214 is on both the data-write and data-read paths. During data read, user-ID-hash module 214 can calculate the unique user ID of the user attempting to read the data (also referred to as the reader's ID) based on unique user identification information included in the read request. User-ID-comparison module 222 can be responsible for checking whether the reader's ID matches the writer's ID included in the to-be-read data. More specifically, a corresponding decoding module (e.g., channel-decoding module 220) can decode the to-be-read data stored on physical media 206 in order to extract the writer's ID associated with the to-be-read data. Note that a mismatch between the reader's ID and the writer's ID indicates that the user who is attempting to read the data is not the user who wrote the data. Consequently, storage system 200 can prevent such a user from accessing the to-be-read data.

Figure 3:
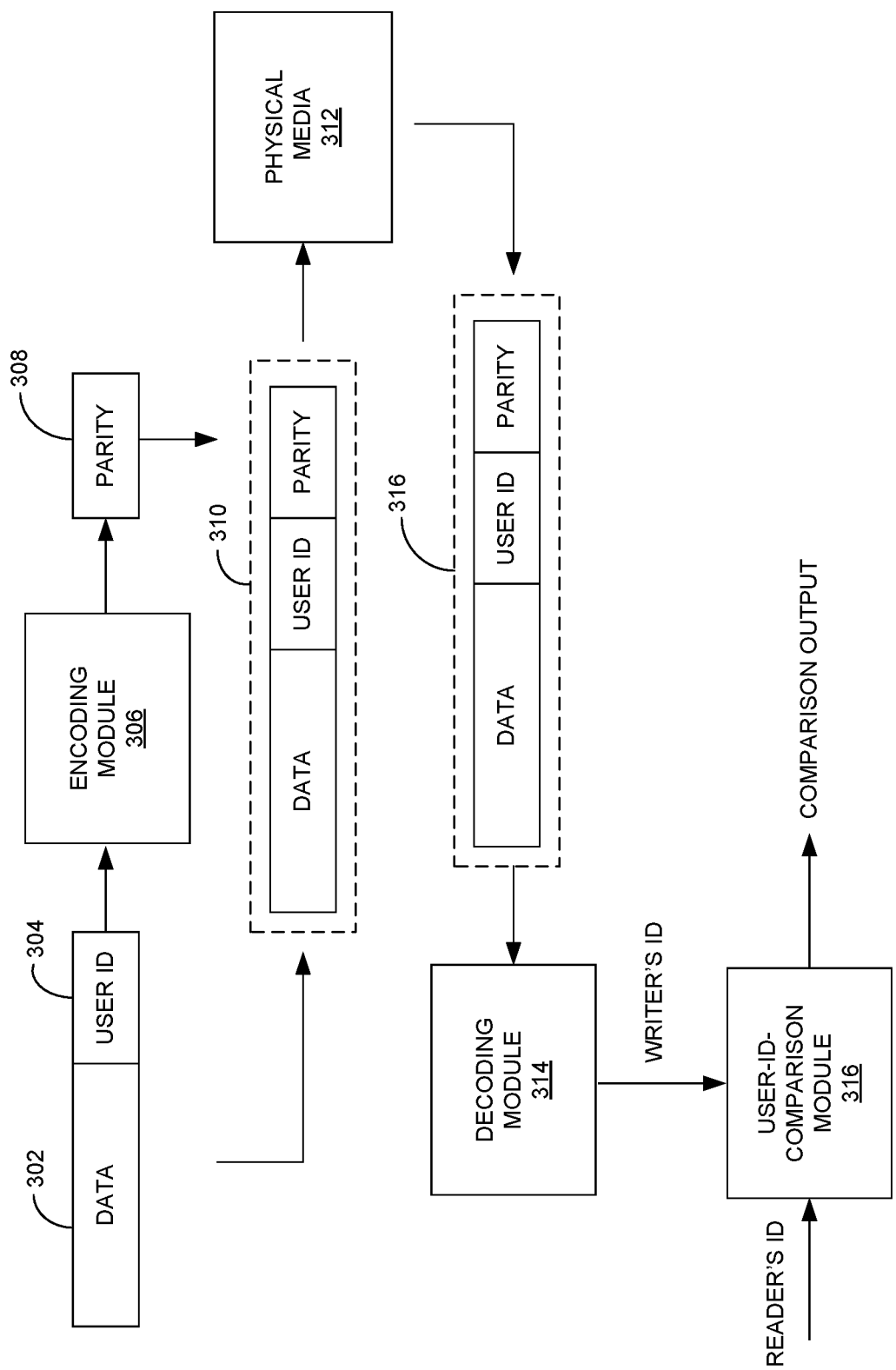
FIG. 3 illustrates an exemplary user-ID-based user-data-security measure, according to one embodiment.

FIG. 3 illustrates an exemplary user-ID-based user-data-security measure, according to one embodiment. During data write, a user-data block 302 can be appended by a unique user ID 304 (or writer's ID 304). Unique user ID 304 can be a predetermined hash function of various types of identification information (e.g., name, address, etc.) of the data writer. In some embodiments, unique user ID 304 can have a fixed, predetermined length. User-data block 302 appended with user ID 304 can be sent to an encoding module 306 for encoding (e.g., channel encoding). In the example shown in FIG. 3, encoding module 306 can output a predetermined number of parity bits, forming a parity block 308. Parity block 308 can be combined with user-data block 302 and unique user ID 304 to form a codeword 310, which will be written into physical media 312.

During data read, a decoding module (e.g., channel-decoding module 314) decodes codeword 316 obtained from physical media 312. In the example shown in FIG. 3, codeword 316 can be similar to codeword 310 and can include a user-data block, a user ID (which is the writer's ID), and a parity block, which includes a predetermined number of parity bits. Channel-decoding module 314 can decode codeword 316 to obtain the writer's ID. The writer's ID can then be sent to a user-ID-comparison module 318 to be compared to the reader's ID. User-ID-comparison module 318 can generate a comparison output based on the comparison result. If the two IDs match, the reader of the data is the same as the writer of the data and can then access the data.

Returning to FIG. 2, location-mapping-validation module 224 can be used to determining whether the logical location specified by the read request exists in a location-mapping table stored on the disk drive. Note that, in order to hide the data of a previous user in the disk drive to block a current user's access, the storage system can use the logical address (e.g., the logical block address (LBA)) as the parameter that the user uses to read/write data. If a logical address is not written by one user, it cannot be read or updated by the same user either. More specifically, the disk drive can maintain a location-mapping table that maintains the mapping between the logical location and the physical location (e.g., an LBA to PBA (physical block address) mapping table). When the disk drive is resold to a new user, the location-mapping table can be reset (e.g., reset to all zeros) or erased. Note that, because the size of the mapping table is much smaller compared to the capacity of the disk (e.g., the size of the mapping table can be less than $\frac{1}{10,000}$ the size of the disk), resetting or erasing the mapping table does not significantly delay the resale of the disk drive.

When a disk drive is initially sold to a cloud user, a virtual machine acting as the host of the disk drive can be generated. The cloud user can choose to deploy the file system or not. When the block device driver receives I/O (input/output) requests from a user application, it can convert the requests into LBAs and send the LBAs to the disk drive. More specifically, each time a logical block is written to the disk drive, the LBA corresponding to the logical block is registered in a location-mapping table stored in the disk drive. Therefore, each time, when the application restarts or the virtual machine resets, the mapping table from the same user could be loaded. However, when the disk drive is resold to another user, the location-mapping table stored on the disk drive can be reset or erased and the LBA-to-PBA mapping information is no longer available at the virtual machine. When a read request for data stored on the disk drive is received, location-mapping-validation module 224 checks whether the LBA-to-PBA mapping specified by the read request matches a corresponding entry in the location-mapping table stored on the disk drive. If and only if a matching entry is found in the location-mapping table, data corresponding to the read request can be returned to the requester.

Figure 4:
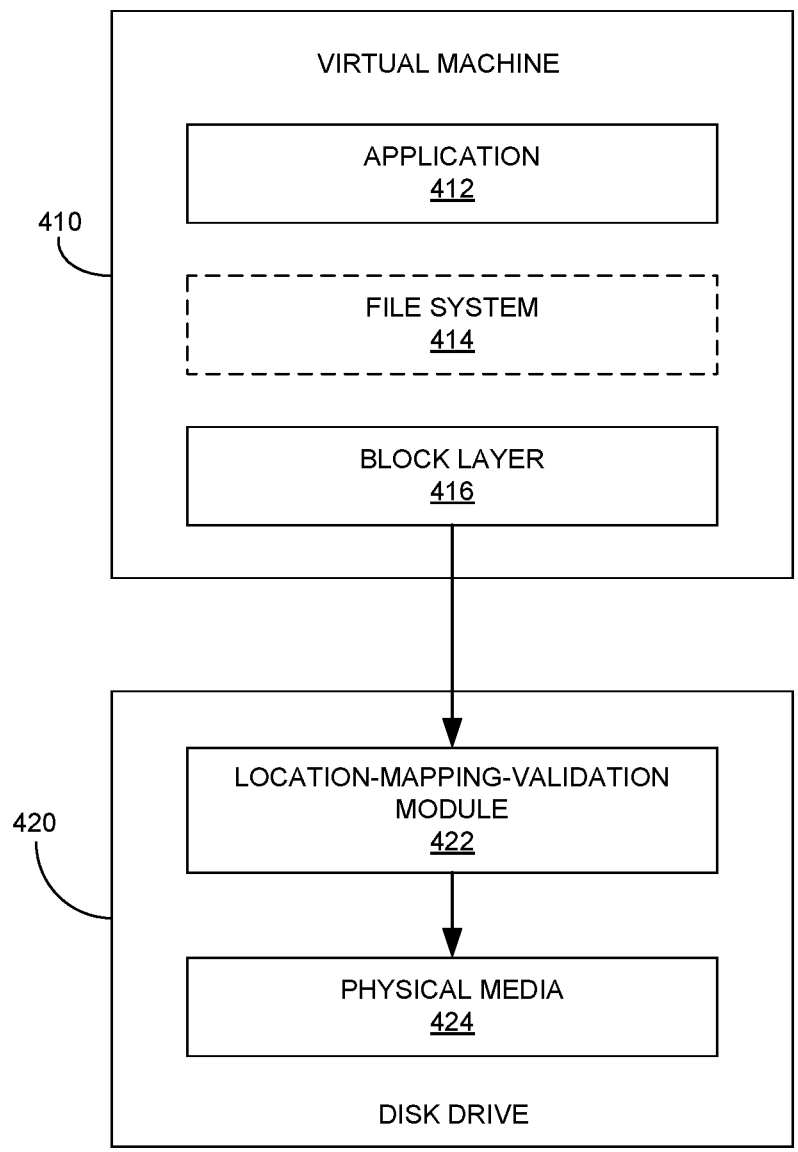
FIG. 4 illustrates the exemplary architecture of a storage system implementing location-mapping-validation, according to one embodiment.

FIG. 4 illustrates the exemplary architecture of a storage system implementing location-mapping-validation, according to one embodiment. In FIG. 4, storage system 400 can include a virtual machine 410 and a disk drive 420. Virtual machine 410 can include a user application 412 running on virtual machine 410, an optional file system 414, and a block layer 416. File system 414 can be deployed by the user. Disk drive 420 can include a location-mapping-validation module 422 and a physical media 424.

Block layer 416 performs the mapping between logical blocks and physical blocks and sends the mapping to disk drive 420. In some embodiments, such a mapping can be stored in location-mapping-validation module 422. More specifically, each time a logical block is written into physical media 424, the mapping between the LBA and the corresponding PBA can be registered in a location-mapping table maintained by location-mapping-validation module 422.

Location-mapping-validation module 422 can validate the location mapping between the logical and physical blocks when disk drive 420 receives a read request. When a matching entry is found, the read request can be responded to with real data; otherwise, disk drive 420 can deny the read request or respond to the read request using dummy data patterns.

To accelerate the lookup process of the location mapping, in some embodiments, the validation process can be split into two steps. The first step is to check a predetermined number of the most significant bits (MSB) of the to-be-validated LBA. If one or more matching entries can be found based on the MSB of the LBA, the system can then determine whether a match can be found based on the remaining least significant bits (LSB) of the LBA. The number of bits in the MSB portion and the LSB portion of the LBA can be the same or different, depending on the implementation. In some embodiments, the LBA can be divided into two equal portions. This two-step validation approach can reduce the amount of consumption of the hardware resources.

Figure 5:
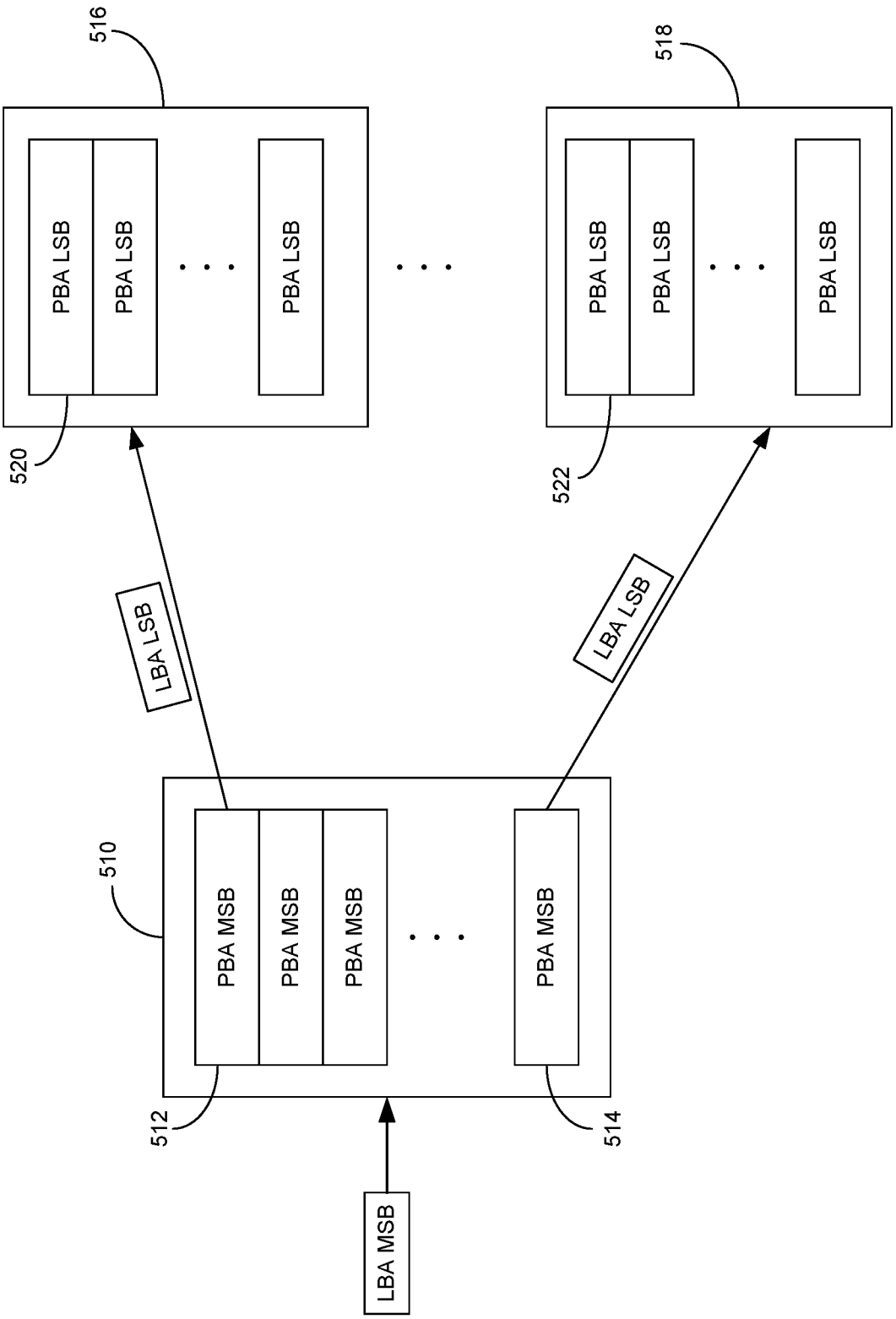
FIG. 5 illustrates the two-step location-validation process, according to one embodiment.

FIG. 5 illustrates the two-step location-validation process, according to one embodiment. During operation, the system divides a logical address (e.g., an LBA) into at least two portions, the most significant bits (MSB) portion and the least significant bits (LSB) portion, with each portion having a certain number of bits. To validate the location mapping for the LBA, the system first performs a lookup based on the MSB of the LBA. More specifically, the location-mapping table can be organized into two levels, the MSB-mapping level and the LSB-mapping level. In the MSB-mapping level, the MSB of an LBA can be mapped to a number of entries, with each entry including the mapping between the MSB of the LBA and the MSB of a corresponding PBA. In the example shown in FIG. 5, MSB-mapping table 510 can include a number of entries (e.g., entries 512 and 514). A lookup can be performed based on the MSB of an LBA. In some embodiments, MSB-mapping table 510 can be cached in the memory accessible by the location-validation module, thus allowing quick access by the location validation module. If no matching entry is found in MSB-mapping table 510, the system invalidates the LBA and denies the corresponding read request.

If one or more mapping entries can be found in MSB-mapping table 510, for each matching entry, the system can load a sub-table that includes mappings between the LSBs of the LBA and the PBA. For example, sub-tables 516 and 518 correspond to entries 512 and 514, respectively. In some embodiments, the sub-tables can be stored in the physical media (e.g., the NAND flash or the HDD platters). Because the sub-tables are only loaded from the physical media to the memory accessible by the location-validation module when matching entries have been found based on the MSB of the LBA, storing the sub-tables on the physical media does not significantly add to the read latency. Each entry in the sub-table can include the LSB portion of a corresponding PBA (e.g., entry 520 in sub-table 516 and entry 522 in sub-table 518). Table lookup based on LSB 524 can be performed in each sub-table. If a matching entry is found, the LBA-to-PBA mapping is validated; otherwise, the system invalidates the LBA and denies the corresponding read request.

Returning to FIG. 2, the outputs of user-ID-comparison module 222 and location-mapping-validation module 224 can be sent to determination module 226, which can perform a disjoint logic operation based on the outputs of user-ID-comparison module 222 and location-mapping-validation module 224. In other words, if any output of user-ID-comparison module 222 and location-mapping-validation module 224 indicates that a read-deny condition is met, determination module 226 can determine that the read-deny condition is met. A read-deny condition is met when user-ID-comparison module 222 determines that the reader's ID does not match the writer's ID or when location-mapping-validation module 224 invalidates an LBA included in a read request. The output of determination module 226 can be used as a selection signal for multiplexing module 228, whose inputs include a dummy data pattern generated by a dummy-data generator 230 and to-be-read data outputted by CRC-decoding module 216. When determination module 226 determines that the read-deny condition is met, determination module 226 outputs a control signal to configure multiplexing module 228 to select the dummy data pattern generated by dummy-data generator 230. When determination module 226 determines that the read-deny condition is not met, determination module 226 outputs a control signal to configure multiplexing module 228 to select the output of CRC-decoding module 216. In other words, if the system determines that the read-deny condition is met, instead of returning decoded user data in response to the read request, the system returns dummy data patterns.

System Operation

Figure 6:
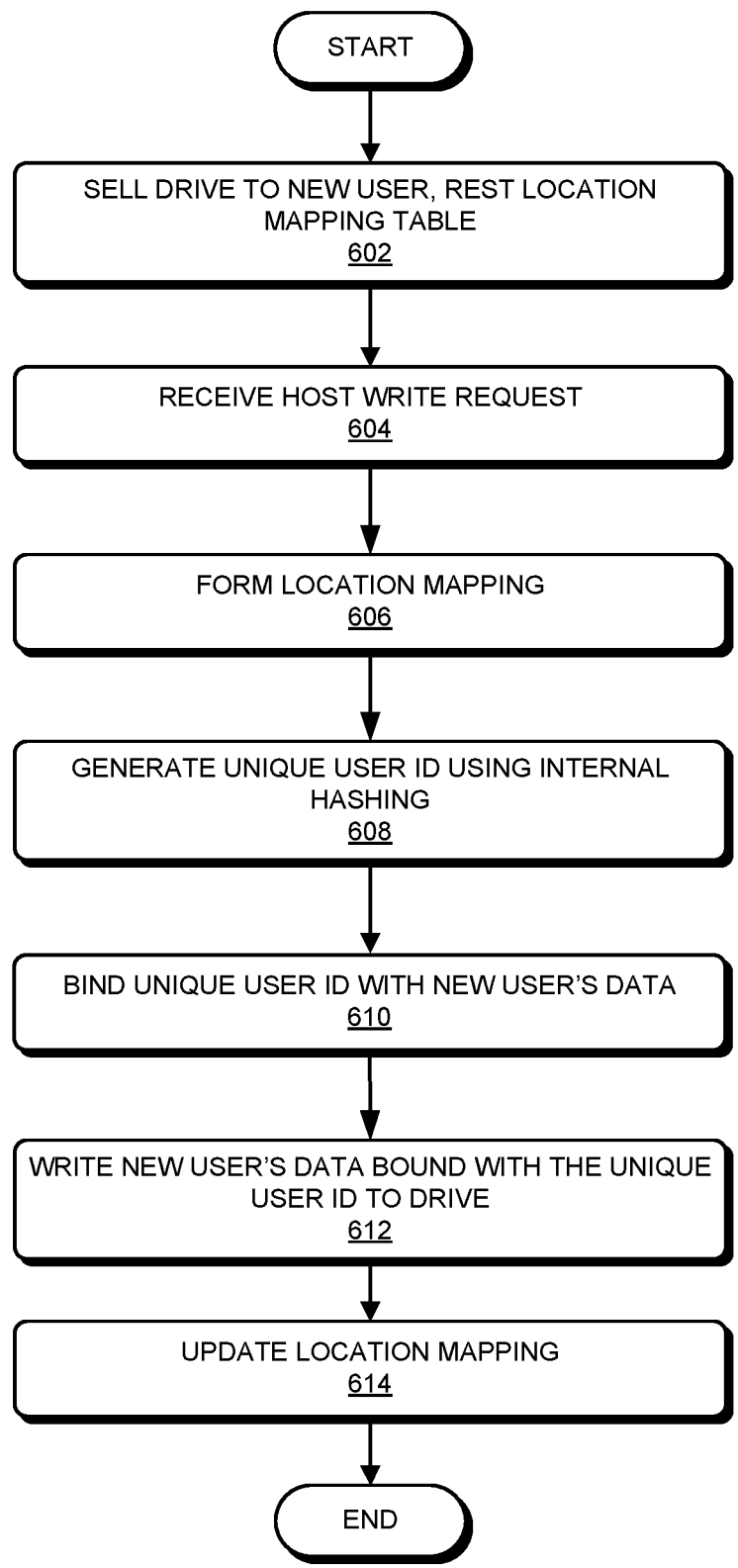
FIG. 6 presents a flowchart illustrating an exemplary data-write process enabling user-data isolation, according to one embodiment.

FIG. 6 presents a flowchart illustrating an exemplary data-write process enabling user-data isolation, according to one embodiment. During operation, a cloud-storage provider sells a disk drive, which can be an HDD- or SSD-based drive, to a new user and erases the location-mapping table previously stored on the drive (operation 602). Note that selling the drive to the user does not mean selling the physical drive, but means selling the right to access the drive to the user. One may also refer to this operation as renting or leasing the drive to the user. The disk drive can then receive a host write request, which can include a number of LBAs corresponding to logical blocks to be written into the drive (operation 604).

Based on the LBAs, the system can form the location mapping, which can include the LBA-to-PBA mapping corresponding to the write request (operation 606). In some embodiments, to form the location mapping, the system may first determine whether the LBA has been filled. In other words, the HDD determines whether a new physical location (e.g., a PBA) has been assigned to the LBA. If so, a table entry indexed with this LBA can be assigned with the new physical location. If not, the system can fill the LBA entry by assigning a physical location (e.g., a PBA).

The system can also generate a unique user ID for the new user using an internal hashing operation (operation 608). In some embodiments, generating the unique user ID may involve applying an internal hash function on various types of user identification information (e.g., name, address, user identifier, etc.). The internal hash function can be carefully selected to avoid hash collision. Moreover, the hash function is kept internal by the cloud provider to prevent possible misuse by malicious users or attackers. Subsequently, the unique user ID can be bound with the new user's to-be-written data (operation 610). In some embodiments, binding the unique user ID with the to-be-written data can be performed by one of the data encoders (e.g., a channel encoder). More specifically, when encoding the to-be-written data, an encoder can encode the combination of the user data and the unique user ID. For example, the unique user ID can append the user data, and a channel encoder can calculate parity bits for the combination.

The system can subsequently write the encoded combination (e.g., the to-be-written data plus the unique user ID) to the drive (operation 612). More specifically, if the drive is HDD-based, the system can directly overwrite the physical location based on the LBA-to-PBA mapping using the new user's data, which is bound with the unique user ID. However, if the drive is SSD-based, in-place writing is not supported, and the system may need to first perform garbage collection if there are not enough free blocks. More specifically, the system may erase and recycle blocks that contain the previous user's data. After enough blocks are freed, the system can write the empty blocks using the new user's data.

Subsequent to writing the new user's data to the drive, the system can update the location mapping (operation 614). In some embodiments, the location mapping can be maintained in a mapping table having two levels, including the MSB-mapping level as well as the LSB-mapping level. Updating the location mapping can involve updating the mapping table at both levels. The MSB-mapping table can be stored in a memory of the disk drive for quick access, whereas the LSB-mapping sub-tables can be stored in the physical media (e.g., the HDD platter or the SSD flash) within the drive. Note that the location mapping is updated after the new user's data is successfully written into the drive to prevent premature reading of the new user's data.

Figure 7:
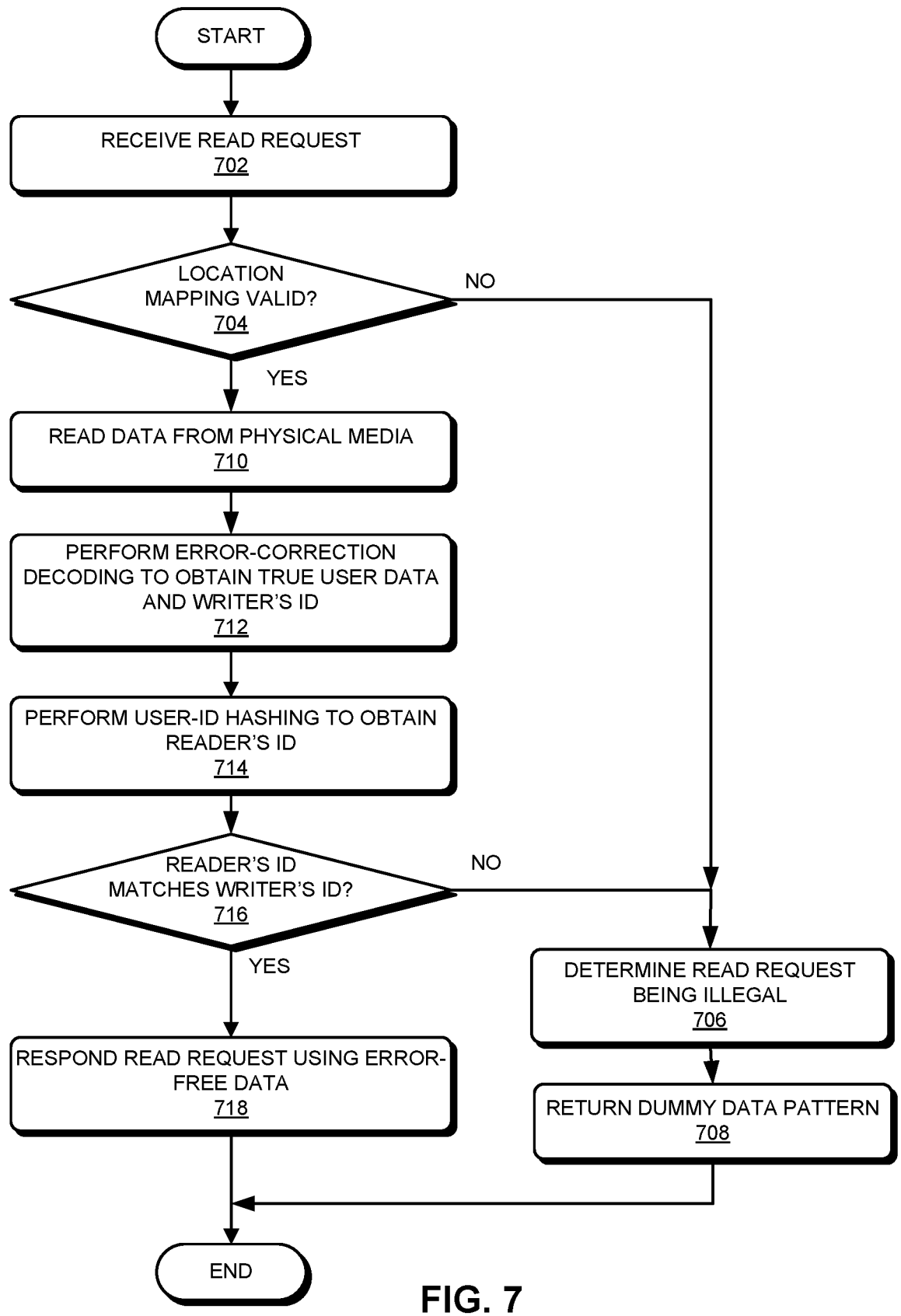
FIG. 7 presents a flowchart illustrating an exemplary data-write process, according to one embodiment.

FIG. 7 presents a flowchart illustrating an exemplary data-write process, according to one embodiment. During operation, the drive receives a read request from a user application (operation 702). The read request can include location-mapping information, such as the LBA. The system can then determine whether the location mapping included in the read request is valid based on information in the received read request (operation 704). In some embodiments, validating the location mapping can include a two-step table lookup operation. The first step involves looking up an MSB-mapping table based on the MSB of the LBA included in the read request. The second step involves looking up corresponding LSB-mapping sub-tables based on the LSB of the LBA included in the read request. If no matching LBA-to-PBA mapping is found in the location-mapping table maintained by the disk drive, the system determines that the read request is illegal (operation 706) and returns a dummy data pattern to the requesting user application (operation 708).

If the location mapping is validated, the system reads data from the physical media (operation 710). The physical media can be the HDD platter or the NAND flash, depending on the type of storage. Note that the data can be retrieved from the corresponding physical location based on the location mapping and the data can be noisy, because error-correction decoding has not been performed. Subsequently, error-correction decoding can be performed to obtain true user data along with the unique user ID (e.g., writer's ID) bound to the data (operation 712). In some embodiments, a channel-decoding operation can be performed to obtain error-free user data and extract the writer's ID appended to the user data.

A user-ID hashing operation can be performed based on user identification information included in the read request to obtain the reader's ID (operation 714). Note that this operation can be performed concurrently with or prior to the data retrieval from the physical media. The obtained reader's ID can then be compared with the writer's ID extracted from user data to determine whether they match each other (operation 716). If the two IDs match, the read request is from the owner or writer of the data, and the system responds to the read request using the error-free data obtained from the drive (operation 718). Otherwise, the system determines that the read request is illegal (operation 706) and returns a dummy data pattern to the requesting user application (operation 708).

Figure 8:
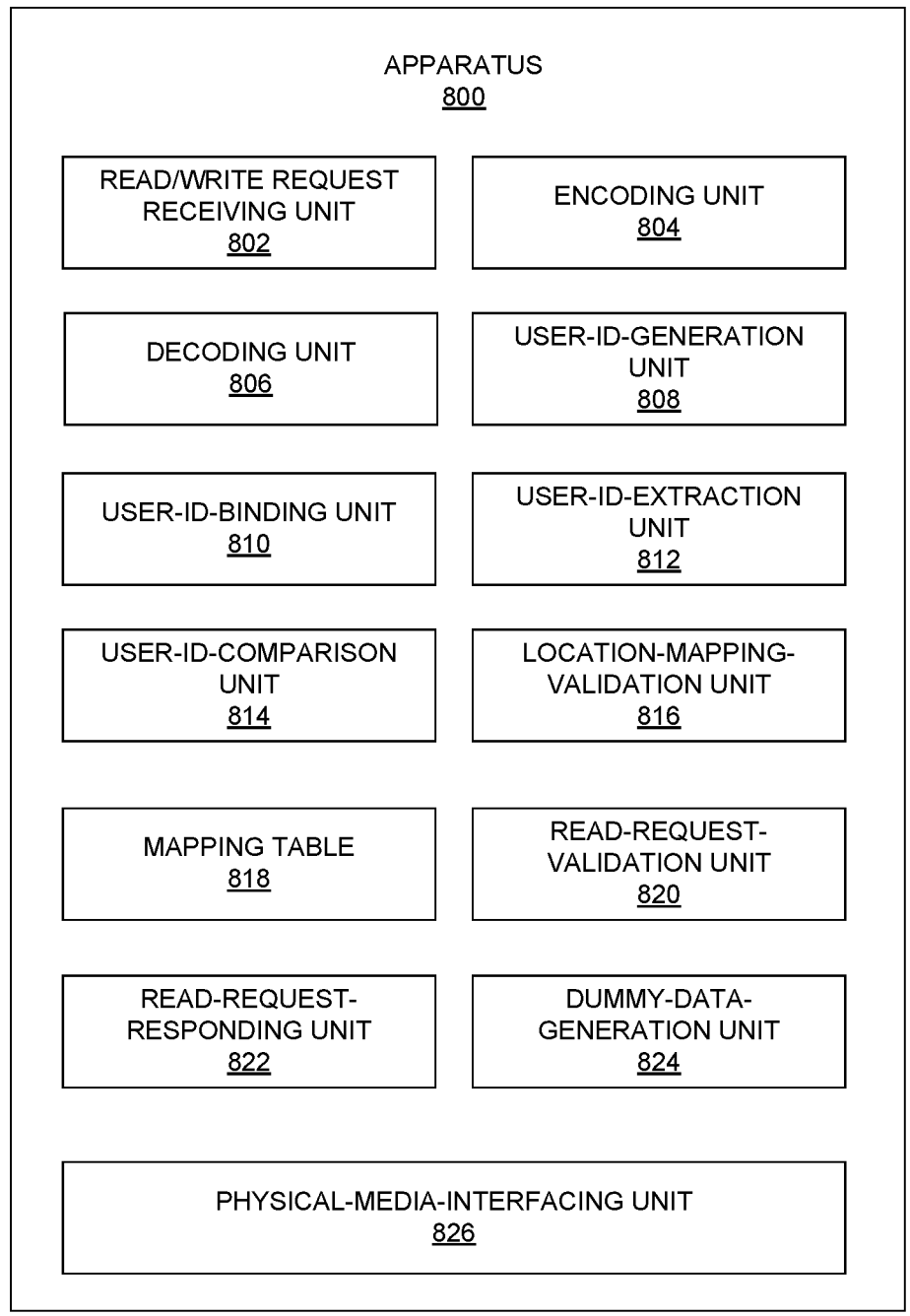
FIG. 8 illustrates an apparatus that facilitates user-data isolation on the cloud drive, according to one embodiment.

FIG. 8 illustrates an apparatus that facilitates user-data isolation on the cloud drive, according to one embodiment. Apparatus 800 can include a read/write request receiving unit 802 for receiving data read/write requests from the host, an encoding unit 804 for encoding the to-be-written data, and a decoding unit 806 for decoding the to-be-read data.

Apparatus 800 can further include a user-ID-generation unit 808 for generating a unique user ID for each cloud user, a user-ID-binding unit 810, a user-ID-extraction unit 812, and a user-ID-comparison unit 814. In some embodiments, user-ID-generation unit 808 can include a hashing module that can calculate a hash function based on various types of user identification information. The hash function needs to be carefully selected to prevent collision and needs to be maintained internally to prevent misuse. User-ID-binding unit 810 can append the unique user ID to a to-be-written data block sent to encoding unit 804, and the unique user ID can be bound to the to-be-written user data through encoding (e.g., channel encoding or other types of encoding operation). User-ID-extraction unit 812 can extract a unique user ID bound to the to-be-read data. In some embodiments, the unique user ID is bound to the data through encoding, and user-ID-extraction unit 812 can extract the unique user ID from the output of decoding unit 806. User-ID-comparison unit 814 can compare the user ID generated from the read request (i.e., the reader's ID) to the user ID extracted from the to-be-read data (i.e., the writer's ID).

Apparatus 800 also includes a location-mapping validation unit 816 for validating the logical address included in a read request. Location-mapping validation unit 816 can access a mapping table 818. In some embodiments, mapping table 814 can include at least two tables, the MSB-mapping table and the LSB-mapping table, with the MSB-mapping table being indexed using the MSB of the LBA and the LSB-mapping table being indexed using the LSB of the LBA.

Apparatus 800 includes a read-request-validation unit 820 for validating the received read request, a read-request-responding unit 822 for responding to the read request, and a dummy-data-generation unit 824. A read request is validated only if the reader's ID matches the writer's ID and the LBA included in the read request is validated. Read-request-responding unit 822 can respond to the read request using true user data outputted by decoding unit 806 if the read request is validated; otherwise, read-request-responding unit 820 can respond to the read request using dummy data patterns generated by dummy-data-generation unit 824. Apparatus 800 can further include a physical-media-interfacing unit 826 for interfacing, including writing and reading data, with the physical media, which can be HDD platters or NAND flashes. More specifically, physical-media-interfacing unit 826 can write the encoded data into the physical media and read the encoded data from the physical media.

By creating the location-mapping table and the user ID comparison on the fly during the data write and data read operations, embodiments of the present invention enable isolation of one user's data from another user's data, thus facilitating a faster resale or turnover of cloud drives. Instead of erasing all data of a previous user before resale of a cloud drive, the cloud provider can simply erase a location-mapping table stored on the cloud drive and then sell the drive to a new user. While responding to the read and write requests from the new user, the disk drive can also perform, in the background, data erase operations (e.g., garbage collection on an SSD-based drive) to erase the data of the previous user. Because the previous user's data has been protected by the writer's ID validation as well as the location-mapping validation process, the new user cannot gain access to the previous user's data. Compared to other user-data-isolation schemes, such as whole drive encryption, the current scheme can provide a significantly higher efficiency.

In general, embodiments disclosed herein can be used for facilitating user data isolation on cloud drives. In addition to facilitating faster resale of the cloud drive, the same principle can also be used in other scenarios where it is necessary to isolate one user's data from another user's data. For example, by binding the unique user ID with the written data and by verifying such a unique user ID during data read, it is possible for different users to share the same cloud drive without worrying about illegal or unauthorized access to their data.

Figure 9:
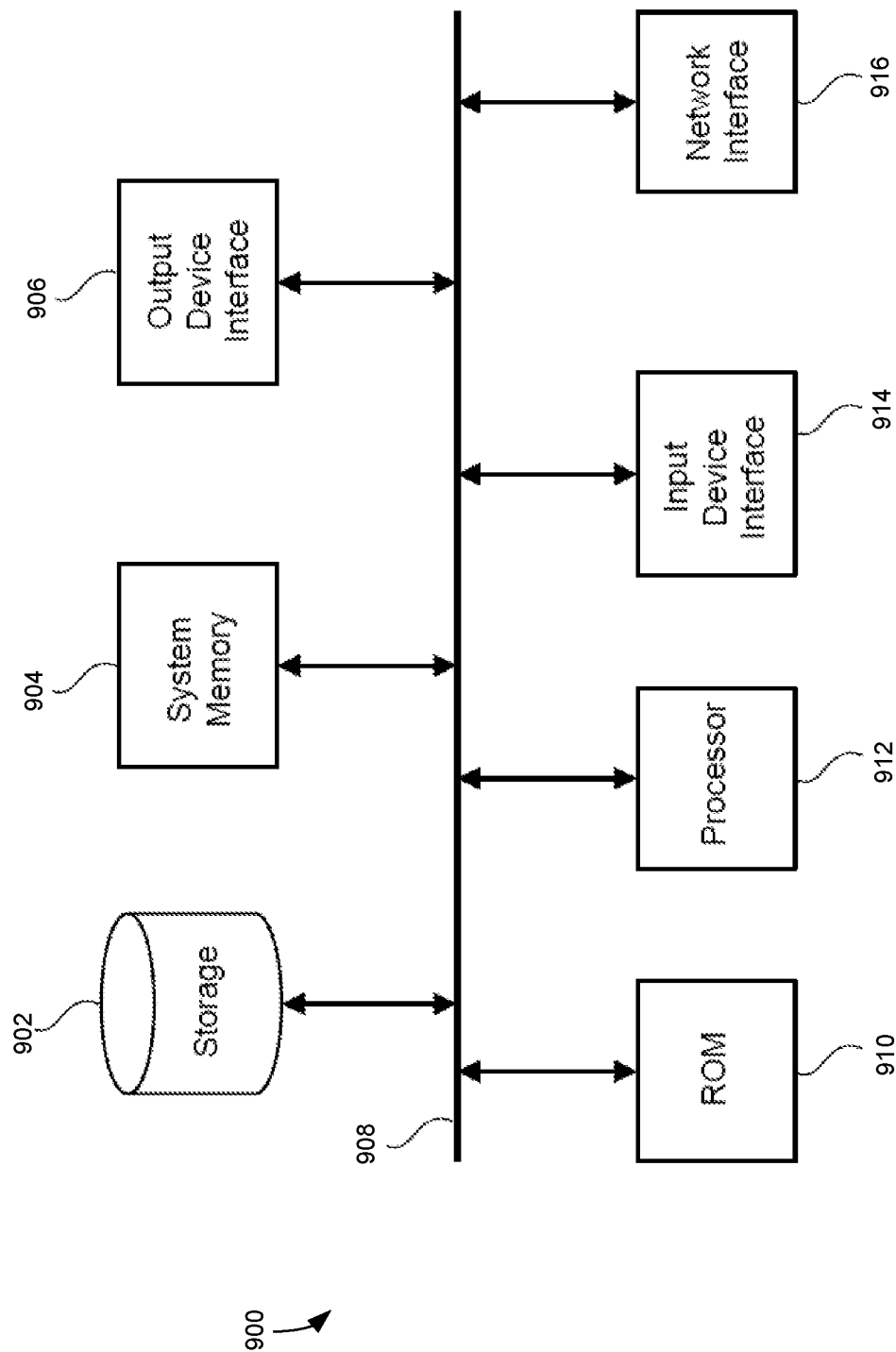
FIG. 9 conceptually illustrates an electronic system, which implements some embodiments of the subject technology.

FIG. 9 conceptually illustrates an electronic system, which implements some embodiments of the subject technology. Electronic system 900 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 900 includes a bus 908, processing unit(s) 912, a system memory 904, a read-only memory (ROM) 910, a permanent storage device 902, an input device interface 914, an output device interface 906, and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and various types of disk drive) as permanent storage device 902. Like permanent storage device 902, system memory 904 is a read-and-write memory device. However, unlike storage device 902, system memory 904 is a volatile read-and-write memory, such as a random access memory. System memory 904 stores some of the instructions and data that the processor needs at runtime. In some implementations, the processes of the subject disclosure are stored in system memory 904, permanent storage device 902, and/or ROM 910. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and send commands to the electronic system. Input devices used with input device interface 914 include, for example, alphanumeric keyboards and pointing devices (also called "cursor control devices"). Output device interface 906 enables, for example, the display of images generated by the electronic system 900. Output devices used with output device interface 906 include, for example, printers and display devices, such as cathode ray tubes (CRT) or liquid crystal displays (LCD). Some implementations include devices such as a touchscreen that function as both input and output devices.

Finally, as shown in FIG. 9, bus 908 also couples electronic system 900 to a network (not shown) through a network interface 916. In this manner, the computer can be a part of a network of computers (such as a local area network ("LAN"), a wide area network ("WAN"), an intranet, or a network of networks, such as the Internet. Any or all components of electronic system 900 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for isolating data written by different users on a cloud drive, the method comprising:
   receiving a write request from a first user comprising to-be-written data;
   binding the to-be-written data with a writer's identifier of the first user by performing error-control encoding on a combination of the to-be-written data and the writer's identifier of the first user; and
   writing the to-be-written data bound with the writer's identifier into physical media associated with the cloud drive, thereby facilitating user data isolation by preventing a second user having a reader's identifier that is different from the writer's identifier of the first user from gaining access to the written data.

2. The computer-implemented method of claim 1, further comprising:
   updating a mapping between a logical address and a physical address of the to-be-written data subsequent to writing the to-be-written data; and
   storing the updated mapping in a location-mapping table located on the cloud drive.

3. The computer-implemented method of claim 2, wherein the location-mapping table comprises a first-level table indexed using most significant bits (MSB) of the logical address and a second-level table indexed using least significant bits (LSB) of the logical address.

4. The computer-implemented method of claim 2, further comprising preparing the cloud drive for resale by removing the location-mapping table from the cloud drive.

5. The computer-implemented method of claim 1, wherein performing the error-control encoding comprises:
   appending the writer's identifier to the to-be-written data; and
   performing a channel-encoding operation on the to-be-written data and the appended writer's identifier.

6. The computer-implemented method of claim 1, wherein the writer's identifier is generated by calculating a hash function based on identification information associated with the first user.

7. The computer-implemented method of claim 1, further comprising erasing, in a background, data of a previous user subsequent to selling the cloud drive to a new user.

8. A computer-implemented method for isolating data written by different users on a cloud drive, the method comprising:
   receiving a read request from a first user for data stored on the cloud drive, the first user having a reader's identifier;
   retrieving, based on the read request, data from physical media associated with the cloud drive, the retrieved data being bound with a writer's identifier of a second user;
   extracting the writer's identifier from the retrieved data by performing error-control decoding on the retrieved data; and
   in response to determining that the extracted writer's identifier does not match the generated reader's identifier, denying the read request.

9. The computer-implemented method of claim 8, further comprising:
   obtaining a logical-address-to-physical-address mapping based on the read request;
   performing a lookup in a location-mapping table currently stored on the cloud drive based on the obtained logical-address-to-physical address mapping; and in response to failing to find a matching entry, denying the read request.

10. The computer-implemented method of claim 8, wherein denying the read request comprises responding to the read request using a dummy data pattern.

11. A cloud storage system for isolating data written by different users, the system comprising:
- a processor;
- a memory coupled to the processor and storing instructions, which when executed by the processor cause the processor to perform a method, the method comprising:
- receiving a write request from a first user comprising to-be-written data;
- binding the to-be-written data with a writer's identifier of the first user by performing error-control encoding on a combination of the to-be-written data and the writer's identifier of the first user;
- writing the to-be-written data bound with the writer's identifier into physical media associated with the cloud storage system;
- receiving a read request from a second user;
- retrieving, based on the read request, data from the physical media;
- extracting a writer's identifier from the retrieved data by performing error-control decoding on the retrieved data;
- determining whether the extracted writer's identifier matches a reader's identifier associated with the second user; and
- denying the read request in response to the determination module determining that the extracted writer's identifier does not match the reader's identifier.

12. The storage system of claim 11, wherein the method further comprises:
- updating a mapping between a logical address and a physical address of the to-be-written data subsequent to writing the to-be-written data; and
- storing the updated mapping in a location-mapping table maintained by the storage system.

13. The storage system of claim 12, wherein the location-mapping table comprises a first-level table indexed using most significant bits (MSB) of the logical address and a second-level table indexed using least significant bits (LSB) of the logical address.

14. The storage system of claim 12, wherein the method further comprises resetting the location-mapping table in response to preparing the storage system for resale.

15. The storage system of claim 14, wherein the method further comprises:
- obtaining a logical-address-to-physical-address mapping based on the read request; and
- performing a lookup in a location-mapping table currently maintained by the storage system based on the obtained logical-address-to-physical address mapping; and
- denying the read request in response to the table-lookup module failing to find a matching entry.

16. The storage system of claim 15, wherein the method further comprises responding to the read request using the retrieved data in response to finding a matching entry and in response to determining that the extracted writer's identifier matches the reader's identifier.

17. The storage system of claim 11, wherein performing the error-control encoding comprises:
- appending the writer's identifier to the to-be-written data; and
- performing a channel-encoding operation on the to-be-written data and the appended writer's identifier.

18. The storage system of claim 11, wherein the method further comprises generating a dummy data pattern, and wherein denying the read request comprises responding to the read request using the dummy data pattern.

19. The storage system of claim 11, wherein the writer's or the reader's identifier is generated by calculating a hash function based on identification information associated with the first or the second user, respectively.

20. The storage system of claim 11, wherein the method further comprises erasing, in a background, data of a previous user subsequent to selling the storage system to a new user.

* * * * *